US010379561B2

(12) United States Patent
Jang

(10) Patent No.: US 10,379,561 B2
(45) Date of Patent: Aug. 13, 2019

(54) ENERGY SAVING METHOD BASED ON CONFIDENCE INTERVAL AND APPARATUS USING THE SAME

(71) Applicant: ELECTRONICS AND TELECOMMUNICATIONS RESEARCH INSTITUTE, Daejeon (KR)

(72) Inventor: Su-Min Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 384 days.

(21) Appl. No.: 15/088,460

(22) Filed: Apr. 1, 2016

(65) Prior Publication Data

US 2016/0363947 A1    Dec. 15, 2016

(30) Foreign Application Priority Data

Jun. 15, 2015    (KR) .......................... 10-2015-0084305

(51) Int. Cl.
G05F 1/66      (2006.01)
G05B 13/02     (2006.01)

(52) U.S. Cl.
CPC ............. G05F 1/66 (2013.01); G05B 13/021 (2013.01)

(58) Field of Classification Search
CPC ................................................... G05B 13/021
See application file for complete search history.

(56) References Cited

U.S. PATENT DOCUMENTS

| 2011/0010222 | A1* | 1/2011 | Choudhary | ............ | G06Q 10/06 705/7.37 |
| 2011/0149820 | A1 | 6/2011 | Lee et al. | | |
| 2011/0171990 | A1 | 7/2011 | Jin et al. | | |
| 2012/0040679 | A1* | 2/2012 | Worrall | ................. | H04W 36/02 455/437 |
| 2014/0181556 | A1* | 6/2014 | Eckert | ..................... | G06F 1/324 713/323 |
| 2014/0237277 | A1* | 8/2014 | Mallinson | ............. | G06F 1/3206 713/323 |
| 2016/0363976 | A1* | 12/2016 | Gatson | ..................... | G06F 1/26 |

FOREIGN PATENT DOCUMENTS

| KR | 10-2010-0075283 A | 7/2010 |
| KR | 10-1324094 B1 | 10/2013 |
| WO | WO 2010/074392 A1 | 7/2010 |

* cited by examiner

*Primary Examiner* — Mohammad Ali
*Assistant Examiner* — Vincent W Chang
(74) *Attorney, Agent, or Firm* — NSIP Law

(57) ABSTRACT

Disclosed herein are an energy saving method based on a confidence interval and an apparatus using the method. The energy saving apparatus based on a confidence interval includes an energy saving performance analysis unit for generating energy saving performance data for each of one or more control modules included in a target system for which energy saving is to be performed, a confidence interval reading unit for generating confidence interval data for each of the one or more control modules, and an energy saving execution unit for establishing an energy-saving policy using the energy saving performance data and executing energy saving for each of the one or more control modules using at least one of the energy-saving policy and the confidence interval data.

18 Claims, 7 Drawing Sheets

ENERGY SAVING METHOD BASED ON CONFIDENCE INTERVAL AND APPARATUS USING THE SAME

CROSS REFERENCE TO RELATED APPLICATION

This application claims the benefit of Korean Patent Application No. 10-2015-0084305, filed Jun. 15, 2015, which is hereby incorporated by reference in its entirety into this application.

BACKGROUND OF THE INVENTION

1. Technical Field

The present invention relates generally to energy saving technology that may minimize energy usage of Information Technology (IT) equipment using confidence interval information and performance evaluation information, which are extracted from pieces of information collected by measuring real-time resource usage and power usage of the IT equipment during a predetermined period of time.

2. Description of the Related Art

Since conventional energy saving technology controls energy saving apparatuses using past data corresponding to several minutes or several seconds, a high monitoring load, which is required to generate continuous predictive data in real time, is entailed. Further, since respective devices cannot share information generated via monitoring with each other, a problem arises in that the monitoring task must be repeatedly performed for respective control modules. Further, a problem also arises in that the number of times a system is controlled to realize energy usage, during an interval in which a minimal change in the system occurs or in which reliability is deteriorated, increases.

When various energy saving policies are applied and used in this way, they are uniformly adopted and used, rather than being applied in a form suitable for the characteristics of the system. As a result, there are many cases where energy saving performance may not be maximized.

Therefore, urgently required is energy saving technology that determines saving performance depending on the power and resource usage of the system and on previously applied energy saving policies, and reads a confidence interval, in which energy saving may be implemented most efficiently, based on the determined information.

PRIOR ART DOCUMENTS

Patent Documents (Patent Document 1) Korean Patent No. 10-1324094 (Date of Publication: Oct. 25, 2013) (entitled "Apparatus and Method for Controlling Power Usage of Load")

SUMMARY OF THE INVENTION

Accordingly, the present invention has been made keeping in mind the above problems occurring in the prior art, and an object of the present invention is to maintain predictive data in the format of log files using a scheme for precisely analyzing previous resource usage and power usage of a system and extracting a confidence interval in advance, thus reducing the load associated with real-time monitoring and remarkably reducing the number of times that the status of a system control module for energy saving is changed.

Another object of the present invention is to perform energy saving only during a confidence interval having high reliability of energy saving, thus maximizing energy saving effects.

A further object of the present invention is to establish an energy-saving policy based on information of performance evaluation performed by each system, thus performing energy saving in consideration of the characteristics of each system.

In accordance with an aspect of the present invention to accomplish the above objects, there is provided an energy saving apparatus based on a confidence interval, including an energy saving performance analysis unit for generating energy saving performance data for each of one or more control modules included in a target system for which energy saving is to be performed; a confidence interval reading unit for generating confidence interval data for each of the one or more control modules; and an energy saving execution unit for establishing an energy-saving policy using the energy saving performance data and executing energy saving for each of the one or more control modules using at least one of the energy-saving policy and the confidence interval data.

The confidence interval reading unit may include an energy usage measurement unit for measuring energy usage of the target system at preset measurement periods; and an energy usage log storage unit for storing data of the energy usage in a format of a log file that is sharable by the one or more control modules for executing energy saving.

The confidence interval reading unit may be configured to, when a confidence interval extraction event is received from a confidence interval extraction controller corresponding to each of the one or more control modules, generate the confidence interval data using at least one of the energy saving performance data and the log file-format energy usage data.

The confidence interval reading unit may include an event generation unit for, when a current time corresponds to a time of application of energy saving corresponding to the confidence interval data, generating an execution request event that requests execution of the energy saving.

The energy saving execution unit may receive the confidence interval data together with an event message corresponding to the execution request event as the execution request event is generated.

The energy usage log storage unit may store at least one item of power usage of each of the one or more control modules, gross power usage of the target system, and usage by respective resources of the target system.

The energy saving performance data may be generated by subdividing power usage and resource usage corresponding to each of the one or more control modules into respective intervals, wherein corresponding optimal energy saving control variables are included in the respective intervals.

The confidence interval data may include multiple data lists, each including at least one of a time of application of energy saving, subdivided interval information, and an optimal energy saving control variable, for each of the one or more control modules.

The energy saving performance analysis unit may generate the energy saving performance data using a performance measurement program.

The energy usage measurement unit may measure the energy usage using at least one of software and external hardware for measuring the energy usage.

In accordance with another aspect of the present invention to accomplish the above objects, there is provided an energy saving method based on a confidence interval, including generating energy saving performance data for each of one or more control modules included in a target system for which energy saving is to be performed; generating confidence interval data for each of the one or more control modules; and establishing an energy-saving policy using the energy saving performance data and executing energy saving for each of the one or more control modules using at least one of the energy-saving policy and the confidence interval data.

Generating the confidence interval data may include measuring energy usage of the target system at preset measurement periods; and storing data of the energy usage in a format of a log file that is sharable by the one or more control modules for executing energy saving.

Generating the confidence interval data may further include receiving a confidence interval extraction event from a confidence interval extraction controller corresponding to each of the one or more control modules, wherein, when the confidence interval extraction event is received, the confidence interval data is generated using at least one of the energy saving performance data and the log file-format energy usage data.

Generating the confidence interval data may further include, when a current time corresponds to a time of application of energy saving corresponding to the confidence interval data, generating an execution request event that requests execution of the energy saving.

Executing the energy saving may include receiving the confidence interval data together with an event message corresponding to the execution request event as the execution request event is generated.

Storing the data of the energy usage may include storing at least one item of power usage of each of the one or more control modules, gross power usage of the target system, and usage by respective resources of the target system.

The energy saving performance data may be generated by subdividing power usage and resource usage corresponding to each of the one or more control modules into respective intervals, wherein corresponding optimal energy saving control variables are included in the respective intervals.

The confidence interval data may include multiple data lists, each including at least one of a time of application of energy saving, subdivided interval information, and an optimal energy saving control variable, for each of the one or more control modules.

Generating the energy saving performance may include generating the energy saving performance data using a performance measurement program.

Measuring the energy usage may include measuring the energy usage using at least one of software and external hardware for measuring the energy usage.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
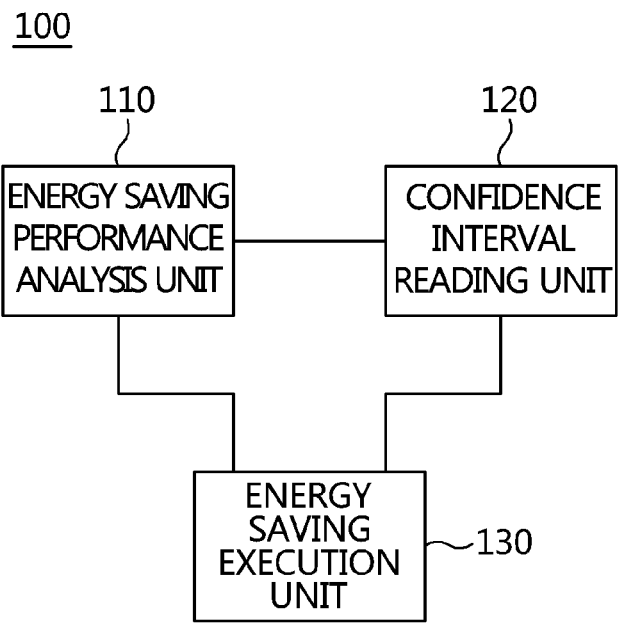
FIG. 1 is a block diagram showing an energy saving apparatus based on a confidence interval according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing an energy saving apparatus based on a confidence interval according to an embodiment of the present invention.

Referring to FIG. 1, an energy saving apparatus 100 based on a confidence interval according to an embodiment of the present invention may include an energy saving performance analysis unit 110, a confidence interval reading unit 120, and an energy saving execution unit 130.

The energy saving performance analysis unit 110 may generate energy saving performance data for each of one or more control modules included in the target system for which energy saving will be performed.

Here, the energy saving performance data may be generated by subdividing power usage and resource usage corresponding to each of the one or more control modules into respective intervals, and respective intervals may have optimal energy saving control variables corresponding thereto.

In this case, the energy saving performance data may be generated using a performance measurement program. For example, by means of performance evaluation such as a formal benchmark test, energy saving performance data for various control modules, such as shutdown, power capping, Dynamic Voltage and Frequency Scaling (DVFS), and deep sleep modules, may be generated. Here, each of the power usage and resource usage may be subdivided into respective intervals, and values corresponding to optimal energy saving control variables may be included in the respective intervals. In particular, the subdivided intervals of power and resource usage may not include intervals that are ineffective in energy saving.

The confidence interval reading unit 120 may generate confidence interval data for each of the one or more control modules. For example, the confidence interval data may have respective directories for various control modules, or may be maintained in respective classified files for various control modules.

Here, the confidence interval is a concept used in the Data Mining which extracts meaningful patterns and rules from the set of a large amount of data. In other words the patterns and rules from the set may expect to occur in each confidence interval. Such a confidence interval may correspond to the confidence interval data which are extracted based on the energy saving performance data for each of one or more control modules.

Here, the energy usage of the target system may be measured at preset measurement periods.

The energy usage may be measured using at least one of software and external hardware, which measure energy usage. For example, energy usage corresponding to a preset measurement period, such as an interval of 1 second or 10 seconds, may be measured using either measurement-related software provided by the system or external measurement hardware.

Here, data of the energy usage may be stored in the format of log files which are sharable by the one or more modules for performing energy saving. That is, since the energy usage data is stored in the format of log files, various control modules may share and refer to the log files. Further, systems which perform the same service or function may be configured such that a measurement module and a log file storage module are executed only in a single system and are referred to remotely.

In this case, at least one item of the power usage of each of one or more control modules, the gross power usage of the target system, and the usage by respective resources of the target system may be stored. An example of usage by respective resources of the target system may be the amounts of various resources used by the system, such as the Central Processing Unit (CPU) usage rate, CPU idle time, network usage rate, and Input/Output (I/O) values.

Further, required data may be additionally stored with the extension of the control modules.

Here, when a confidence interval extraction event is received from a confidence interval extraction controller corresponding to each of the one or more control modules, confidence interval data may be generated using at least one of energy-saving data and log file-format energy usage data. For example, when events are received from respective confidence interval extraction controllers corresponding to multiple control modules, such as shutdown, power capping, DVFS, and deep sleep control modules, the confidence interval data may be generated using the energy-saving data and energy usage data of the corresponding modules. That is, confidence intervals during which energy saving is induced may be generated based on pieces of energy saving performance data for respective control modules, and confidence interval data may be generated based on the results of the generation.

Further, the confidence interval data may also be distinguished and stored for respective control modules in the format of log files.

Here, when a current time corresponds to the time of application of energy saving corresponding to confidence interval data, an execution request event that requests the execution of energy saving may be generated. For example, the times of energy saving application, included in pieces of confidence interval data corresponding to respective control modules, such as shutdown, power capping, DVFS, and deep sleep control modules, are checked. When there is a module for which the current time corresponds to the time of energy saving application, an execution request event for the corresponding module may be generated. That is, the interval corresponding to the time of energy saving application is expected to be an interval having high efficiency for energy saving performance, and an event enabling energy saving to be performed during the corresponding interval may be generated.

In this case, the confidence interval data may include multiple data lists including at least one of the time of energy saving application, subdivided interval information, and an optimal energy-saving control variable, for each of the one or more control modules. Further, there may be control modules having no data list.

The energy saving execution unit 130 may establish an energy-saving policy using the energy-saving performance data, and may execute energy saving for each of the one or more control modules using at least one of the energy-saving policy and the confidence interval data. For example, a portion effective in energy saving is determined using energy-saving performance data, and the energy-saving policy may be established with reference to the corresponding portion.

In this case, control modules for executing energy saving may be additionally extended. Therefore, it is possible to simultaneously apply energy saving to multiple control modules or to determine a processing procedure in consideration of the degree of energy saving, through the use of the energy saving apparatus.

Here, as an execution request event is generated, confidence interval data, together with an event message corresponding to the execution request event, may be received. For example, the confidence interval data and the energy-saving performance data may be secured so as to perform energy saving by receiving the execution request event, and energy saving may be performed using the secured data.

In this way, when the energy saving apparatus according to the present invention is used, the confidence interval may be extracted in advance by precisely analyzing the previous resource usage and power usage of the system, thus solving the problem with the conventional scheme, which generates predictive data for each module in real time.

Further, since a confidence interval suitable for the characteristic of each control module is extracted, the effect of performing energy saving may be maximized.

Furthermore, since the confidence interval data is stored in the format of log files, it may be applied without requiring a procedure in which different systems for providing the same service extract predictive data, thus reducing monitoring and predictive data analysis costs. Further, energy saving apparatuses provided in respective systems incorporate the results obtained by executing a performance evaluation program, such as a benchmark program, into energy saving policies, thus enabling the confidence interval data to be very easily applied to systems to which the confidence interval data has not previously been applied.

Figure 2:
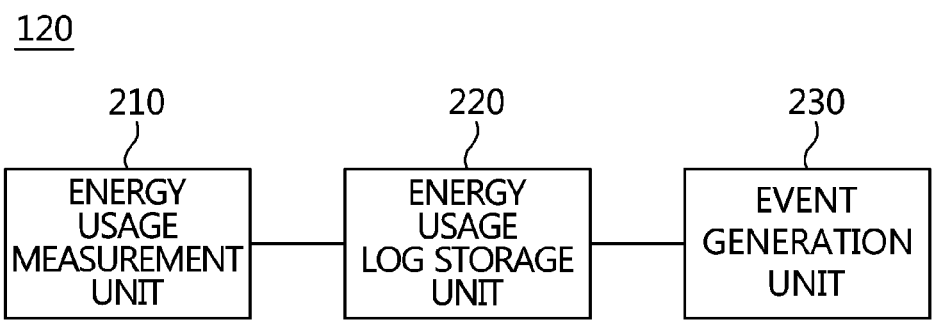
FIG. 2 is a block diagram showing an example of the confidence interval reading unit shown in FIG. 1.

FIG. 2 is a block diagram showing an example of the confidence interval reading unit shown in FIG. 1.

Referring to FIG. 2, the confidence interval reading unit 120 shown in FIG. 1 may include an energy usage measurement unit 210, an energy usage log storage unit 220, and an event generation unit 230.

The energy usage measurement unit 210 may measure the energy usage of a target system at preset measurement periods.

Here, energy usage may be measured using at least one of software and external hardware that measures energy usage. For example, energy usage corresponding to a preset measurement period, such as an interval of 1 second or 10 seconds, may be measured using either measurement-related software provided by the system or external measurement hardware.

The energy usage log storage unit 220 may store the data of the energy usage in the format of log files which are sharable by the one or more modules for performing energy saving. That is, since the energy usage data is stored in the format of log files, various control modules may share and refer to the log files. Further, systems which perform the same service or function may be configured such that a measurement module and a log file storage module are executed only in a single system and are referred to remotely.

In this case, at least one item of the power usage of each of one or more control modules, the gross power usage of the target system, and the usage by respective resources of the target system may be stored. An example of usage by respective resources of the target system may be the amounts of various resources used by the system, such as the CPU usage rate, CPU idle time, network usage rate, and I/O values.

Further, required data may be additionally stored with the extension of the control modules.

The event generation unit 230 may generate an execution request event that requests the execution of energy saving when a current time corresponds to the time of application of energy saving corresponding to confidence interval data. For example, the times of energy saving application, included in pieces of confidence interval data corresponding to respective control modules, such as shutdown, power capping, DVFS, and deep sleep control modules, are checked. When there is a module for which the current time corresponds to the time of energy saving application, an execution request event for the corresponding module may be generated. That is, the interval corresponding to the time of energy saving application is expected to be an interval having high efficiency for energy saving performance, and an event enabling energy saving to be performed during the corresponding interval may be generated.

Figure 3:
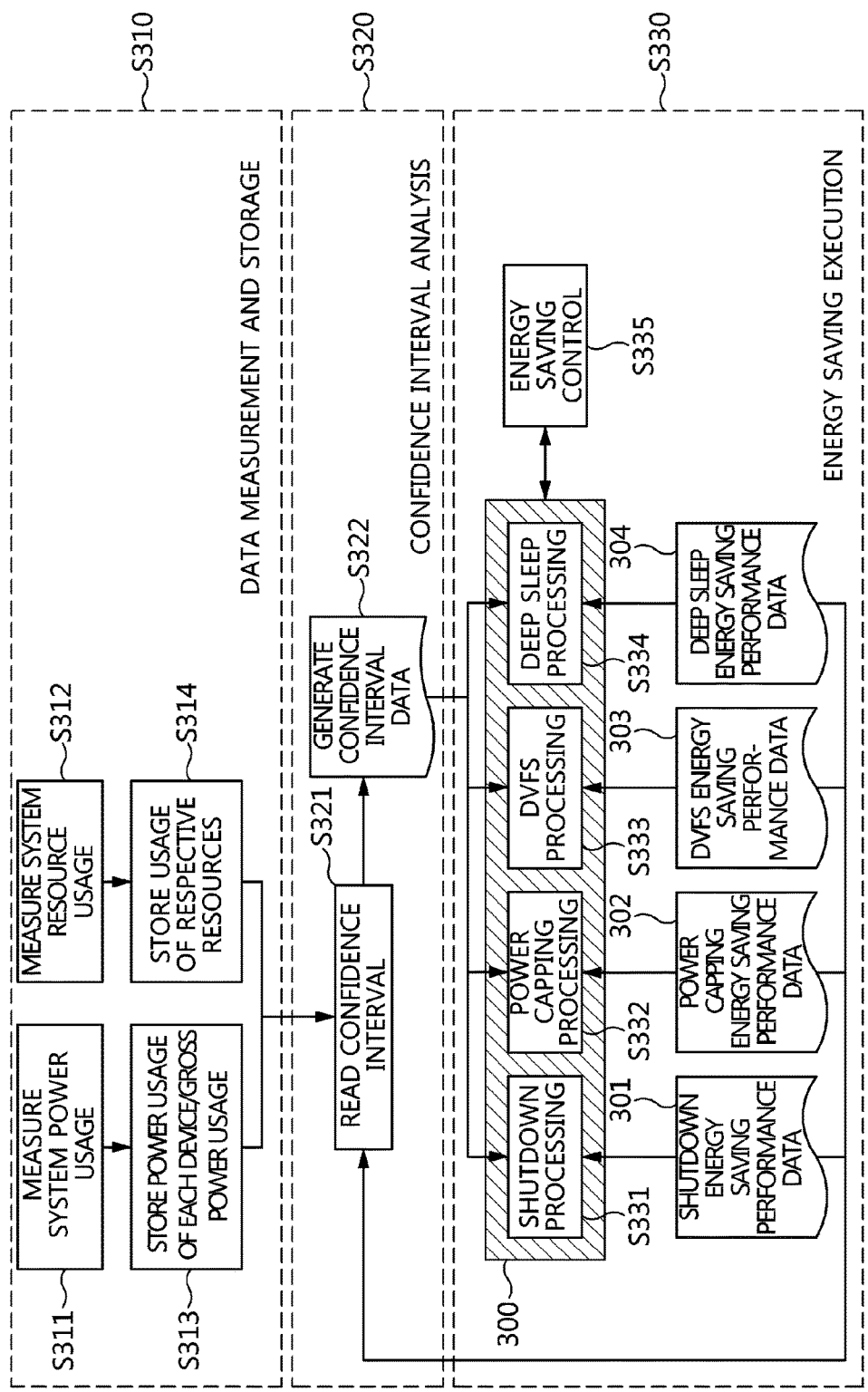
FIG. 3 is a diagram showing an energy saving system based on a confidence interval according to an embodiment of the present invention.

FIG. 3 is a diagram showing an energy saving system based on a confidence interval according to an embodiment of the present invention.

Referring to FIG. 3, the energy saving system based on a confidence interval according to the embodiment of the present invention may divide operating steps into the step S310 of measuring and storing data, the step S320 of analyzing a confidence interval, and the step S330 of executing energy saving, wherein each step may include detailed operations.

For example, at the step S310 of measuring and storing data, the power usage of the system is measured at step S311, and data of the power usage may be separately stored after being divided into the gross power usage of the entire system and the power usage of respective devices at step S313. Further, resource usage is measured separately from the power usage at step S312, and data of the resource usage may be stored after being divided into the usage by the system of respective resources at step S314. For example, the usage by the system of respective resources may be classified into the amounts of respective resources used by the system, such as CPU usage rate, CPU idle time, network usage rate, and I/O values, and respective classified usage amounts may be measured and stored.

Further, at the step S320 of analyzing the confidence interval, a confidence interval in which energy saving is induced is read based on energy saving performance data 301, 302, 303, and 304 of the multiple control modules, such as shutdown, power capping, DVFS, and deep sleep modules included in the energy saving target system at step S321, and then confidence interval data may be generated at step S322.

Here, energy-saving performance data 301, 302, 303, and 304 of multiple control modules may be generated by subdividing each of power usage and resource usage into various intervals via performance evaluation such as a formal benchmark test, and values corresponding to optimal energy saving control variables may be included in the respective intervals. In particular, the subdivided intervals may exclude intervals that are ineffective in energy saving.

Further, the confidence interval data may be maintained in directories corresponding to multiple control modules in the format of files. Further, the file contents of confidence interval data may include one or more data lists, each having information about the time of energy saving application, subdivided interval information, and a value corresponding to the optimal energy saving control variable for processing. Here, some control modules may have no data list.

Further, at the step S330 of executing energy saving, energy saving for multiple control modules may be simultaneously controlled at step S335, or alternatively, a processing procedure may be determined in consideration of the degree of energy saving, depending on the confidence interval data generated based on the energy saving performance data 301, 302, 303, and 304 configured for respective control modules.

Here, each of the control modules may perform shutdown processing S331, power capping processing S332, DVFS processing S333, and deep sleep processing S334.

Further, it may be possible to additionally extend control modules that will perform energy saving.

Figure 4:
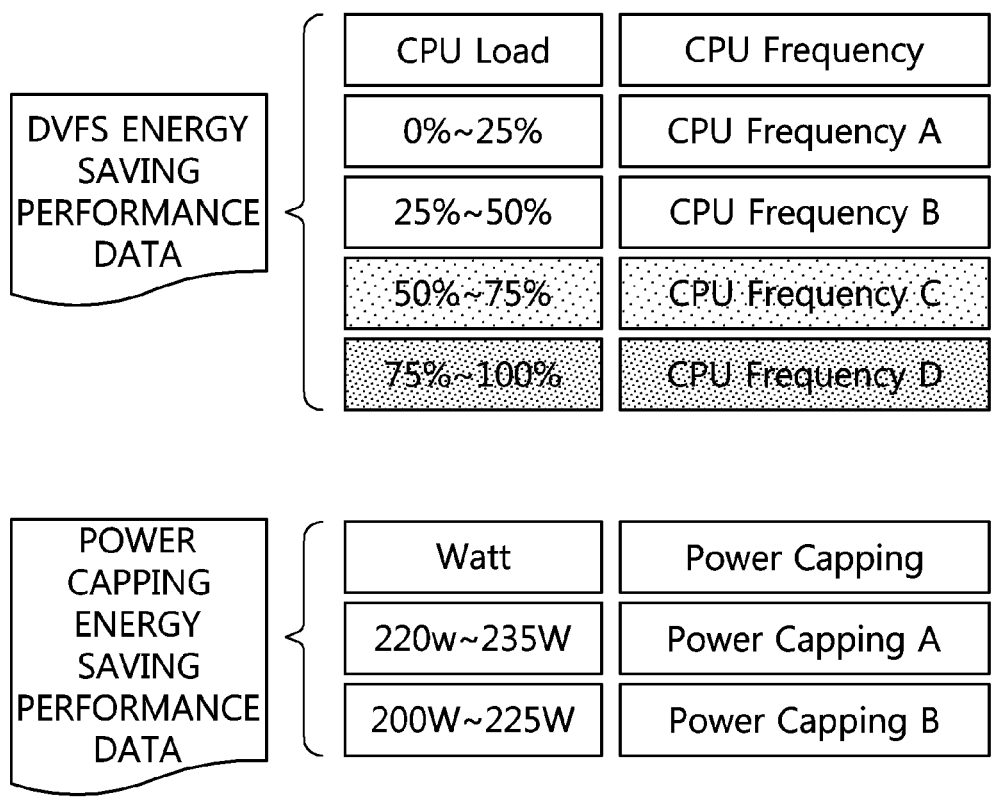
FIG. 4 is a diagram showing energy-saving policy data according to an embodiment of the present invention.

FIG. 4 is a diagram showing energy-saving policy data according to an embodiment of the present invention.

Referring to FIG. 4, the energy saving performance data of control modules, such as shutdown, power capping, DVFS, and deep sleep modules, may be generated by subdividing each of power usage and resource usage into various intervals in advance via performance evaluation such as a formal benchmark test, and values corresponding to optimal energy saving control variables may be included in the respective intervals. In particular, the subdivided intervals for power and resource usage may exclude intervals ineffective in energy saving, as in the case of power capping energy saving performance data shown in FIG. 4.

Figure 5:
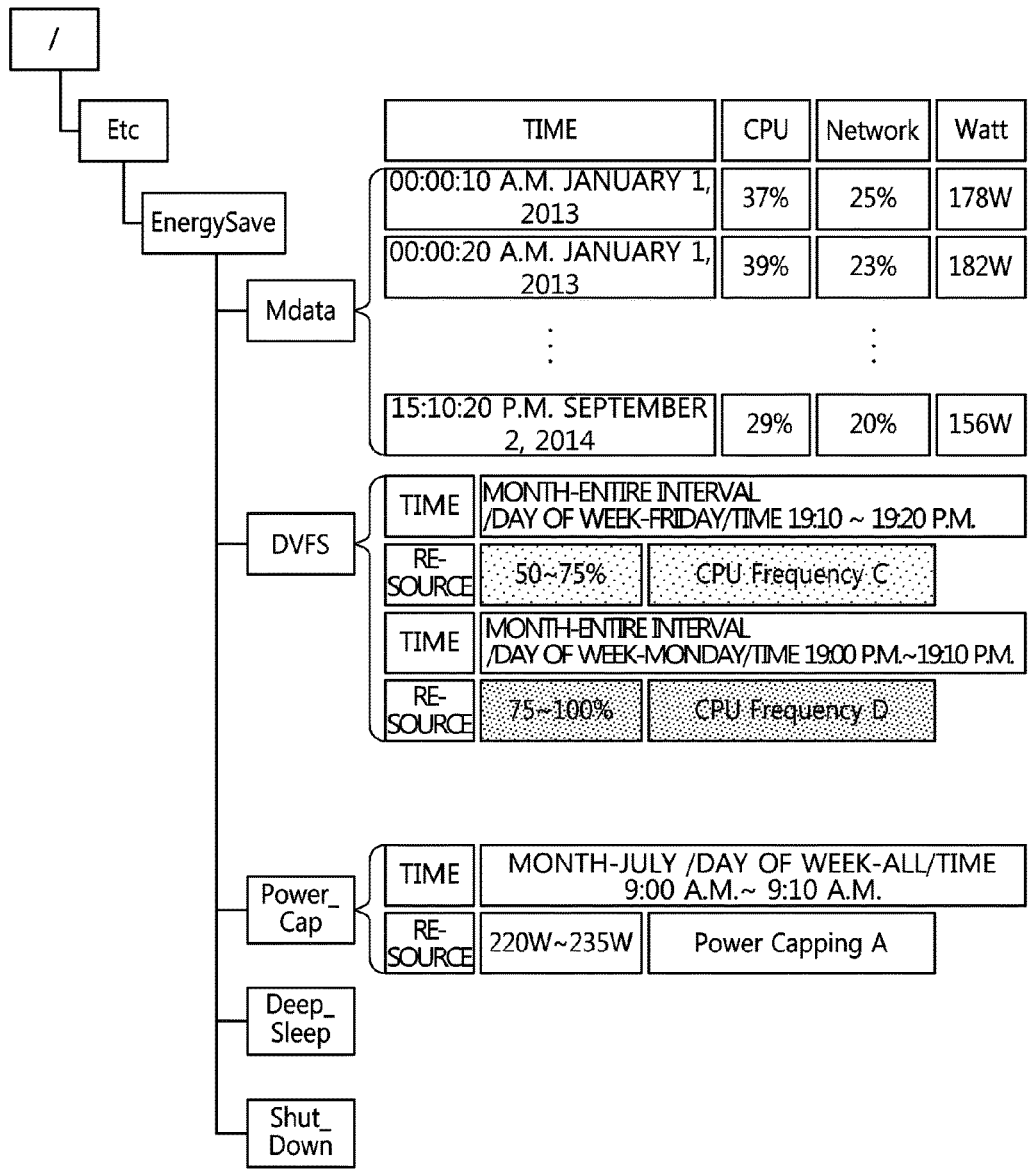
FIG. 5 is a diagram showing confidence interval data according to an embodiment of the present invention.

FIG. 5 is a diagram showing confidence interval data according to an embodiment of the present invention.

Referring to FIG. 5, confidence interval data according to the embodiment of the present invention may be configured such that control modules have directories corresponding to the confidence interval data or maintain the data in the format of classified files.

Further, the file contents of confidence interval data may include one or more data lists, each having information about the time of energy saving application, subdivided interval information, and a value corresponding to the optimal energy saving control variable for processing. Here, a specific control module may have no data list.

Figure 6:
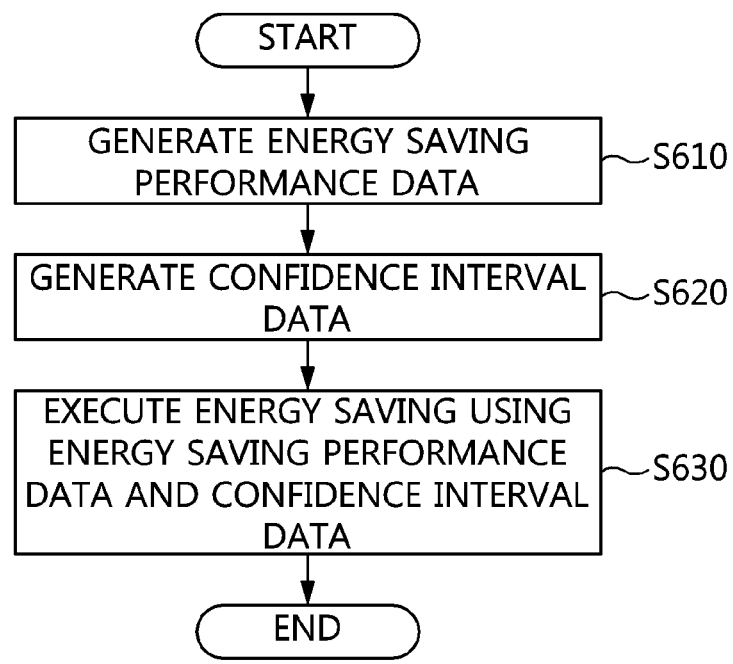
FIG. 6 is an operation flowchart showing an energy saving method based on a confidence interval according to an embodiment of the present invention.

FIG. 6 is an operation flowchart showing an energy saving method based on a confidence interval according to an embodiment of the present invention.

Referring to FIG. 6, the energy saving method based on a confidence interval according to an embodiment of the present invention may generate energy-saving performance data for each of one or more control modules included in a target system for which energy saving will be performed at step S610.

Here, the energy saving performance data may be generated by subdividing power usage and resource usage corresponding to each of the one or more control modules into respective intervals, and respective intervals may have optimal energy saving control variables corresponding thereto.

In this case, the energy saving performance data may be generated using a performance measurement program. For example, by means of performance evaluation such as a formal benchmark test, energy saving performance data for various control modules, such as shutdown, power capping, DVFS, and deep sleep modules, may be generated. Here, each of the power usage and resource usage may be subdivided into respective intervals, and values corresponding to optimal energy saving control variables may be included in the respective intervals. In particular, the subdivided intervals of power and resource usage may not include intervals that are ineffective in energy saving.

Further, the energy saving method based on a confidence interval according to an embodiment of the present invention may generate confidence interval data for each of the one or more control modules at step S620. For example, the confidence interval data may have respective directories for various control modules, or may be maintained in respective classified files for various control modules.

Here, the confidence interval is a concept used in the Data Mining which extracts meaningful patterns and rules from the set of a large amount of data. In other words the patterns and rules from the set may expect to occur in each confidence interval. Such a confidence interval may correspond to the confidence interval data which are extracted based on the energy saving performance data for each of one or more control modules.

Here, the energy usage of the target system may be measured at preset measurement periods.

The energy usage may be measured using at least one of software and external hardware, which measure energy usage. For example, energy usage corresponding to a preset measurement period, such as an interval of 1 second or 10 seconds, may be measured using either measurement-related software provided by the system or external measurement hardware.

Here, data of the energy usage may be stored in the format of log files which are sharable by the one or more modules for performing energy saving. That is, since the energy usage data is stored in the format of log files, various control modules may share and refer to the log files. Further, systems which perform the same service or function may be configured such that a measurement module and a log file storage module are executed only in a single system and are referred to remotely.

In this case, at least one item of the power usage of each of one or more control modules, the gross power usage of the target system, and the usage by respective resources of the target system may be stored. An example of usage by respective resources of the target system may be the amounts of various resources used by the system, such as the CPU usage rate, CPU idle time, network usage rate, and I/O values.

Further, required data may be additionally stored with the extension of the control modules.

Here, when a confidence interval extraction event is received from a confidence interval extraction controller corresponding to each of the one or more control modules, confidence interval data may be generated using at least one of energy-saving data and log file-format energy usage data. For example, when events are received from respective confidence interval extraction controllers corresponding to multiple control modules, such as shutdown, power capping, DVFS, and deep sleep control modules, the confidence interval data may be generated using the energy-saving data and energy usage data of the corresponding modules. That is, confidence intervals during which energy saving is induced may be generated based on pieces of energy saving performance data for respective control modules, and confidence interval data may be generated based on the results of the generation.

Further, the confidence interval data may also be distinguished and stored for respective control modules in the format of log files.

Here, when a current time corresponds to the time of application of energy saving corresponding to confidence interval data, an execution request event that requests the execution of energy saving may be generated. For example, the times of energy saving application, included in pieces of confidence interval data corresponding to respective control modules, such as shutdown, power capping, DVFS, and deep sleep control modules, are checked. When there is a module for which the current time corresponds to the time of energy saving application, an execution request event for the corresponding module may be generated. That is, the interval corresponding to the time of energy saving application is expected to be an interval having high efficiency for energy saving performance, and an event enabling energy saving to be performed during the corresponding interval may be generated.

In this case, the confidence interval data may include multiple data lists including at least one of the time of energy saving application, subdivided interval information, and an optimal energy-saving control variable, for each of the one or more control modules. Further, there may be control modules having no data list.

Furthermore, the energy saving method based on a confidence interval according to an embodiment of the present invention may establish an energy-saving policy using the energy saving performance data, and may execute energy saving for each of the one or more control modules using at least one of the energy-saving policy and the confidence interval data at step S630. For example, a portion effective in energy saving is determined using energy-saving performance data, and the energy-saving policy may be established with reference to the corresponding portion.

In this case, control modules for executing energy saving may be additionally extended. Therefore, it is possible to simultaneously apply energy saving to multiple control modules or to determine a processing procedure in consideration of the degree of energy saving, through the use of the energy saving apparatus.

Here, as an execution request event is generated, confidence interval data, together with an event message corresponding to the execution request event, may be received. For example, the confidence interval data and the energy-saving performance data may be secured so as to perform energy saving by receiving the execution request event, and energy saving may be performed using the secured data.

Figure 7:
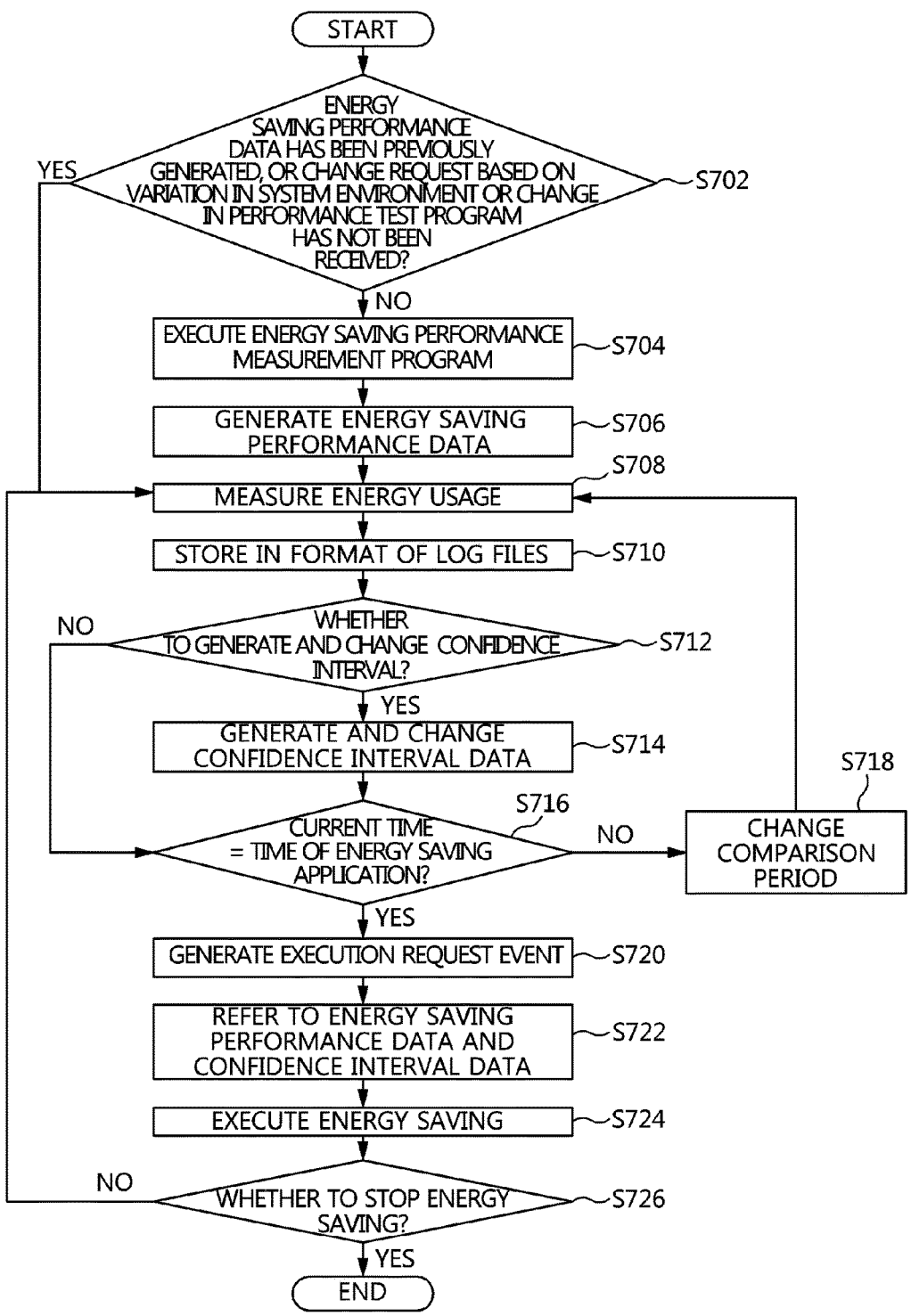
FIG. 7 is an operation flowchart showing in detail an energy saving method based on a confidence interval according to an embodiment of the present invention.

FIG. 7 is an operation flowchart showing in detail an energy saving method based on a confidence interval according to an embodiment of the present invention.

Referring to FIG. 7, the energy saving method based on a confidence interval according to the embodiment of the present invention may determine at least one of whether energy saving performance data has been previously generated by executing energy saving, and whether a change request based on a variation in a system environment or a change in a performance test program has not been received at step S702.

If it is determined at step S702 that no energy saving performance data has been generated or that a change request has been received, an energy saving performance measurement program is executed at step S704, and then energy saving performance data may be generated at step S706.

In this regard, the energy saving performance data may be generated such that each of power usage and resource usage corresponding to each of the one or more control modules is subdivided into respective intervals, and corresponding optimal energy saving control variables may be included in the respective intervals.

Further, if it is determined at step S702 that energy saving performance data has been generated or that no change request has been received, energy saving may be executed with reference to the previously generated energy-saving performance data.

Thereafter, the energy usage of the target system for which energy saving will be performed may be measured at preset measurement periods at step S708.

Here, the energy usage may be measured using at least one of software and external hardware which measures energy usage.

Thereafter, data of the energy usage may be stored in the format of log files that may be shared by the one or more modules for performing energy saving at step S710.

Here, at least one item of the power usage of each of one or more control modules included in the target system, the gross power usage of the target system, and the usage by respective resources of the target system may be stored.

Thereafter, whether to generate and change the confidence interval data to be referred to when performing energy saving may be determined based on the energy usage data stored in the format of the log files at step S712.

If it is determined at step S712 that confidence interval data is to be generated and changed, the confidence interval data may be generated and changed using at least one of the energy-saving data and the log file-format energy usage data at step S714.

Here, as a confidence interval extraction event is received from the confidence interval extraction controller corresponding to each of the one or more control modules, confidence interval data may be generated.

Further, the confidence interval data may include multiple data lists including at least one of the time of energy saving application, subdivided interval information, and an optimal energy-saving control variable, for each of the one or more control modules. Further, there may be control modules having no data list.

Thereafter, the current time is checked, and it may be determined whether the current time corresponds to the time of energy saving application at step S716.

If it is determined at step S716 that the current time does not correspond to the time of energy saving application, the comparison period required to compare the current time with the time of energy saving application, at which an energy saving policy is to be applied, is changed at step S718, and then energy usage is measured again.

Here, it is possible to change the comparison period, thus preventing the energy-saving policy from being unnecessarily frequently changed according to the time of energy saving application of the energy-saving policy by suitably changing the comparison period.

For example, when it is assumed that the time at which the energy-saving policy is to be applied is between 1 p.m. and 2 p.m., the current time is 11 a.m., and the comparison period is an interval of 10 minutes, energy saving may be performed over a total of 12 iteration procedures ranging from the current time unless the comparison period is changed. However, as a result of the comparison, when the current time does not correspond to the time of energy-saving policy application, comparison is completed by sequentially increasing the comparison period by 10 minutes in such a way that a first comparison time is 11:10 a.m., a second comparison time is 11:30 a.m., a third comparison time is 12 p.m., a fourth comparison time is 12:40 p.m., and a fifth comparison time, which is the last comparison time, is 1:30 p.m. Then, the energy-saving policy is applied, and then energy saving is performed.

In the above example, since the period is changed every 10 minutes, energy saving is not performed during the 30-minute time interval between 1 p.m. and 1:30 p.m. However, in an actual system, the comparison period may be changed more precisely, thus reducing the length of time during which energy saving is not performed.

Further, if it is determined at step S716 that the current time corresponds to the time of energy saving application, an execution request event, requesting the execution of energy saving, may be generated at step S720. For example, the times of energy saving application included in respective pieces of confidence interval data corresponding to respective control modules, such as shutdown, power capping, DVFS, and deep sleep modules, are checked. If there is a module for which the current time corresponds to the time of energy saving application, an execution request event for the corresponding module may be generated.

Next, as the execution request event is generated, confidence interval data, together with an event message corresponding to the execution request event, may be delivered to a control stage for performing energy saving and may be referred to at step S722.

Thereafter, an energy-saving policy is established using the energy-saving performance data, and energy saving may be executed for each of the one or more control modules using at least one of the energy-saving policy and the confidence interval data at step S724.

Here, the control module for performing energy saving may be additionally extended. Therefore, energy saving may be simultaneously applied to multiple control modules by using the energy saving apparatus, or alternatively a processing procedure may be determined in consideration of the extent of energy saving.

Thereafter, it may be determined whether to stop energy saving at step S726.

For example, if a command for terminating the performance of energy saving is input by a system manager, it may be determined that the performance of energy saving is to be stopped.

If it is determined at step S726 that energy saving is to be stopped, the energy saving apparatus is terminated, and the performance of energy saving may be stopped.

Further, if it is determined at step S726 that energy saving is not to be stopped, energy usage is measured at step S708, and then the flow of a process for energy saving may be continuously performed.

Figure 8:
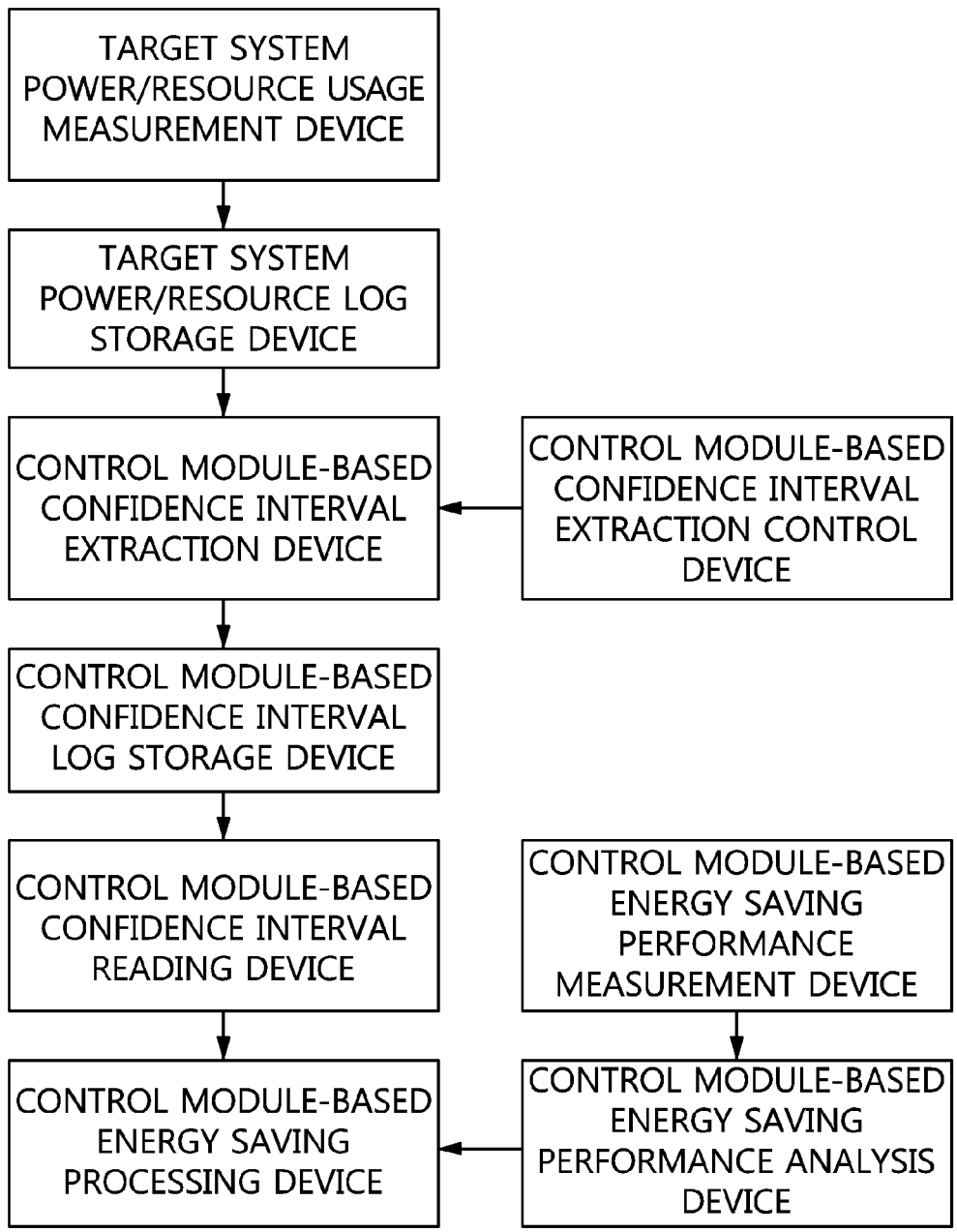
FIG. 8 is a diagram showing processing devices depending on the flow of the energy saving method based on a confidence interval according to an embodiment of the present invention.

FIG. 8 is a diagram showing processing devices depending on the flow of the energy saving method based on a confidence interval according to an embodiment of the present invention.

Referring to FIG. 8, in the energy saving method based on a confidence interval according to the embodiment of the present invention, a target system power and resource usage measurement device may measure energy usage corresponding to a predetermined period, such as an interval of 1 second or 10 seconds, via measurement-related software or external measurement hardware provided by the target system.

Next, the data of the measured energy usage may be stored in the format of log files by a target system power and resource log storage device. In this case, since the data of energy usage is stored in the format of log files, multiple control modules may share and refer to the log files. Further, in the case of different systems which perform the same service or function, only a single system may execute the system power and resource usage measurement device and the system power and resource usage log storage device, and other systems may remotely refer to the log.

Then, a control module-based confidence interval extraction device may receive a confidence interval extraction event from a control module-based confidence interval extraction control device, and may extract and generate pieces of confidence interval data suitable for respective control modules included in the target system.

Thereafter, a control module-based confidence interval log storage device may distinguish and store the pieces of confidence interval data, which are extracted and generated for respective control modules, in the format of log files for respective control modules.

Next, a control module-based confidence interval reading device may generate a processing request event, required to process energy saving of each control module, when a current time corresponds to the time of energy saving application included in the confidence interval data via the comparison of the current time. Further, as the processing request event is generated, the confidence interval data may be delivered to a control module-based energy saving processing device.

Further, a control module-based energy saving performance measurement device may execute a performance measurement program, such as various benchmark programs.

Then, a control module-based energy saving performance analysis device may provide energy saving performance data so that the control module-based energy saving processing device establishes an energy-saving policy with reference to a portion effective in energy saving.

Thereafter, a control module-based energy saving processing device may perform energy saving with reference to the energy saving performance data and confidence interval data for each control module.

In accordance with the present invention, predictive data is maintained in the format of log files using a scheme for precisely analyzing the previous resource usage and power usage of a system and extracting confidence intervals in advance, thus reducing the load associated with real-time monitoring, and remarkably reducing the number of times that the status of system control modules for energy saving is changed.

Further, the present invention may maximize the effect of energy saving by performing energy saving only during an interval having high reliability of energy saving.

Furthermore, the present invention establishes an energy-saving policy based on information about performance evaluation performed by each system, thus realizing energy saving in consideration of the characteristics of each system.

Furthermore, the present invention may be applied without requiring a procedure for extracting predictive data in real time, thus reducing monitoring and predictive data analysis costs.

Furthermore, the present invention incorporates the results of executing a performance evaluation program, such as a benchmark program, into an energy-saving policy for respective saving control devices in each system, thus being very useful when applied to a system to which energy saving has not been previously applied.

As described above, in the energy saving method based on a confidence interval and apparatus using the method according to the present invention, the configurations and schemes in the above-described embodiments are not limitedly applied, and some or all of the above embodiments can be selectively combined and configured so that various modifications are possible.

What is claimed is:

1. An energy saving apparatus, comprising:
a processor configured to:
generate energy saving performance data for each of one or more control modules included in a target system for which energy saving is to be performed;
in response to a confidence interval extraction event being received from a confidence interval extraction controller corresponding to each of the one or more control modules, generate confidence interval data for each of the one or more control modules using either one or both of the energy saving performance data and data of energy usage of the target system;
establish an energy-saving policy using the energy saving performance data;
generate an execution request event to request execution of the energy saving, in response to a current time corresponding to a time of an application of energy saving that corresponds to the confidence interval data;
receive the confidence interval data together with an event message corresponding to the execution request event as the execution request event is generated; and
execute an energy saving operation for each of the one or more control modules using either one or both of the energy-saving policy and the confidence interval data, in response to receiving the confidence interval data together with the event message,
wherein the confidence interval data corresponds to a confidence interval, which corresponds to a reliability interval that is extracted based on data mining to enable the processor to perform the energy saving immediately and without performing additional checks or monitoring,
wherein the energy-saving policy corresponds to a combined type of policy that allows energy savings to be simultaneously applied to a combination of the one or more control modules, and
wherein the energy-saving policy is configured to be changed in consideration of expansion of the one or more control modules.

2. The energy saving apparatus of claim 1, wherein the processor is further configured to measure the energy usage at specified measurement periods, and store the data of the energy usage in a format of a log file that is sharable by the one or more control modules.

3. The energy saving apparatus of claim 2, wherein the processor is further configured to store any one or any combination of any two or more of power usage of each of the one or more control modules, gross power usage of the target system, and usage by respective resources of the target system.

4. The energy saving apparatus of claim 2, wherein the processor is further configured to measure the energy usage using either one or both of software and external hardware for measuring the energy usage.

5. The energy saving apparatus of claim 1, wherein
the energy saving performance data is generated by subdividing power usage and resource usage corresponding to each of the one or more control modules into respective intervals, and
corresponding optimal energy saving control variables are included in the respective intervals.

6. The energy saving apparatus of claim 5, wherein
the confidence interval data comprises multiple data lists for each of the one or more control modules, and
each of the multiple data lists comprises any one or any combination of any two or more of the time of the application of energy saving, subdivided interval information, and an optimal energy saving control variable.

7. The energy saving apparatus of claim 1, wherein the processor is further configured to generate the energy saving performance data using a performance measurement program.

8. The energy saving apparatus of claim 1, wherein the execution of the energy saving operation minimizes an energy usage of a computer system.

9. An energy saving method, comprising:
generating energy saving performance data for each of one or more control modules included in a target system for which energy saving is to be performed;
in response to a confidence interval extraction event being received from a confidence interval extraction controller corresponding to each of the one or more control modules, generating confidence interval data for each of the one or more control modules using either one or both of the energy saving performance data and data of energy usage of the target system;
establishing an energy-saving policy using the energy saving performance data;
generating an execution request event to request execution of the energy saving, in response to a current time corresponding to a time of an application of energy saving that corresponds to the confidence interval data;
receiving the confidence interval data together with an event message corresponding to the execution request event as the execution request event is generated; and
executing an energy saving operation for each of the one or more control modules using either one or both of the energy-saving policy and the confidence interval data, in response to the receiving of the confidence interval data together with the event message,
wherein the confidence interval data corresponds to a confidence interval, which corresponds to a reliability interval that is extracted based on data mining to enable the processor to perform the energy saving immediately and without performing additional checks or monitoring, wherein the energy-saving policy corresponds to a combined type of policy that allows energy savings to be simultaneously applied to a combination of the one or more control modules, and
wherein the energy-saving policy is configured to be changed in consideration of expansion of the one or more control modules.

10. The energy saving method of claim 9, wherein the generating of the confidence interval data comprises measuring the energy usage at specified measurement periods, and storing the data of the energy usage in a format of a log file that is sharable by the one or more control modules.

11. The energy saving method of claim 10, wherein the storing of the data of the energy usage comprises storing of power usage of each of the one or more control modules, gross power usage of the target system, and usage by respective resources of the target system.

12. The energy saving method of claim 10, wherein the measuring of the energy usage comprises measuring the energy usage using either one or both of software and external hardware for measuring the energy usage.

13. The energy saving method of claim 9, wherein
the energy saving performance data is generated by subdividing power usage and resource usage corresponding to each of the one or more control modules into respective intervals, and
corresponding optimal energy saving control variables are included in the respective intervals.

14. The energy saving method of claim 13, wherein
the confidence interval data comprises multiple data lists for each of the one or more control modules, and
each of the multiple data lists comprises any one or any combination of any two or more of an application of energy saving, subdivided interval information, and an optimal energy saving control variable.

15. The energy saving method of claim 9, wherein the generating of the energy saving performance data comprises generating the energy saving performance data using a performance measurement program.

16. The energy saving method of claim 9, wherein the confidence interval data is generated based on confidence intervals during which saving of energy is induced, which are generated based on respective pieces of the energy saving performance data.

17. The energy saving method of claim 9, wherein the energy saving performance data is generated by subdividing each of power usage and resource usage into intervals via performance evaluation while excluding intervals determined to be ineffective at saving energy.

18. The energy saving method of claim 9, further comprising changing a delay period for comparing the current time with the time of the application of energy saving, in response to determining that the current time does not correspond to the time of the application of energy saving.

* * * * *